(12) United States Patent
Lehman

(10) Patent No.: US 9,018,523 B1
(45) Date of Patent: *Apr. 28, 2015

(54) ELECTRICAL SUBSTATION AND ANIMAL MITIGATION SYSTEM THEREFOR

(71) Applicant: W. Scott Lehman, Winfield, IL (US)

(72) Inventor: W. Scott Lehman, Winfield, IL (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/737,155

(22) Filed: Jan. 9, 2013

Related U.S. Application Data

(63) Continuation of application No. 13/091,951, filed on Apr. 21, 2011, now Pat. No. 8,353,224.

(60) Provisional application No. 61/326,481, filed on Apr. 21, 2010.

(51) Int. Cl.
*H02B 1/06* (2006.01)
*H02G 3/04* (2006.01)
*E04B 1/72* (2006.01)

(52) U.S. Cl.
CPC ... *H02G 3/04* (2013.01); *E04B 1/72* (2013.01)

(58) Field of Classification Search
USPC ...... 174/138 F, 138 E, 137 R, 138 G; 52/101; 361/602
See application file for complete search history.

(56) References Cited

U.S. PATENT DOCUMENTS

| 4,071,882 | A | 1/1978 | Rehder |
| 4,845,307 | A | 7/1989 | Cumming et al. |
| 6,349,510 | B1 * | 2/2002 | Haas et al. ............. 52/79.5 |
| 7,622,668 | B1 | 11/2009 | Tollefson et al. |
| 8,353,224 | B1 | 1/2013 | Lehman |

OTHER PUBLICATIONS

Dudderar, et al.; "Ecology and Control of Wildlife Damage to Electric Substations"; Eastern Wildlife Damage Control Conferences, Seventh Eastern Wildlife Damage Management Conference, 1995; University of Nebraska-Lincoln; Proc. East. Wildl. Mgmt. Conf. 7:132-138; 1997; printed from http://digitialcommons.unl.edu/ewdcc7/8.

* cited by examiner

*Primary Examiner* — Dhirubhai R Patel
(74) *Attorney, Agent, or Firm* — Ungaretti & Harris LLP

(57) ABSTRACT

An electrical substation is shown and described. The electrical substation has a plurality of substation components selected from a group consisting of circuit breakers, transformers, voltage regulators, switchgear, control houses, and structural members. Each of the plurality of substation components is supported above ground-level. An animal mitigation system surrounds each of the plurality of substation components. The animal mitigation system is a shroud constructed around a substation component or a portion of a substation component to provide a barrier to entry to an internal volume of the shroud in which the component or portion of the component is housed.

20 Claims, 10 Drawing Sheets

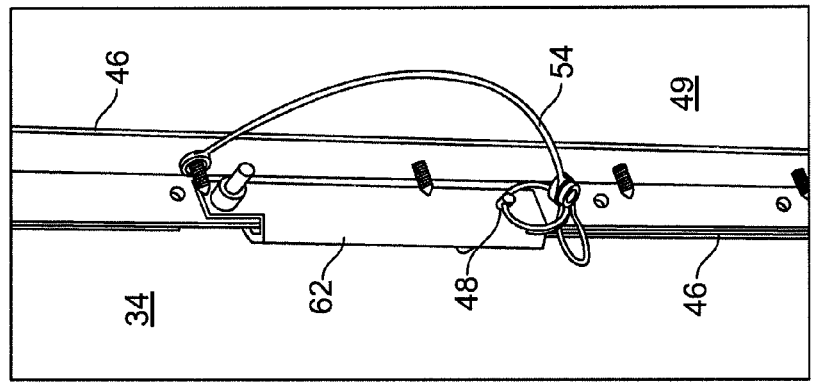
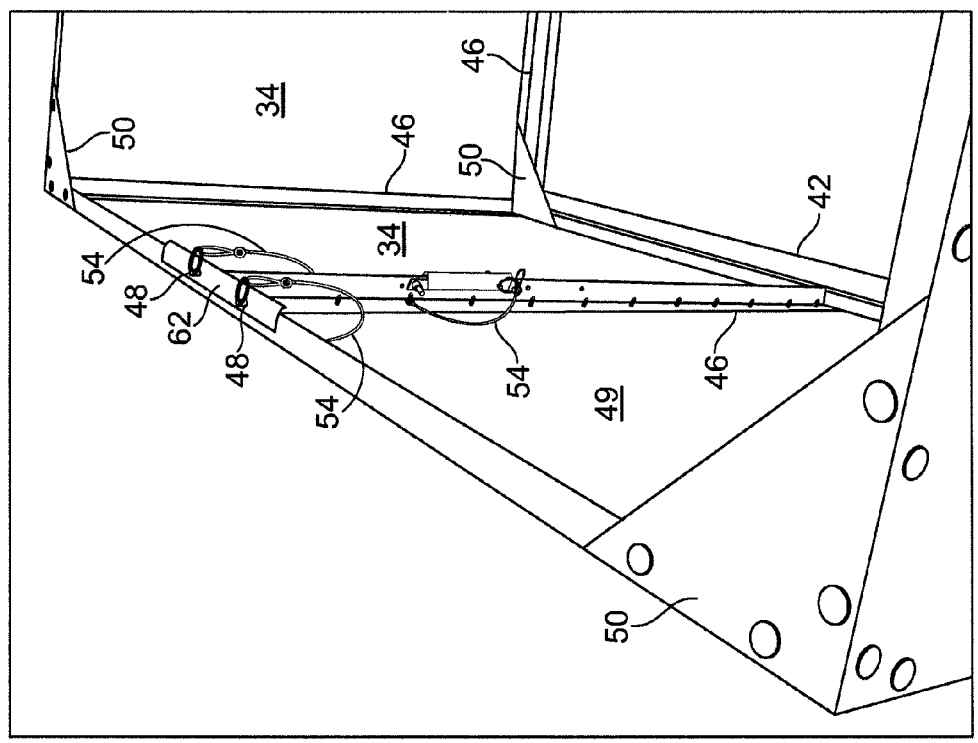

ELECTRICAL SUBSTATION AND ANIMAL MITIGATION SYSTEM THEREFOR

CROSS-REFERENCE TO RELATED APPLICATIONS

This present application is a Continuation of application Ser. No. 13/091,951 filed Apr. 21, 2011 which claimed the benefit of U.S. Provisional Patent Application No. 61/326,481 filed Apr. 21, 2010, now U.S. Pat. No. 8,353,224, and which the contents of both Applications are incorporated herein by reference.

FEDERALLY SPONSORED RESEARCH OR DEVELOPMENT

N/A

TECHNICAL FIELD

The invention relates to animal mitigation systems and more particularly to animal mitigation systems for use in electrical substations and the like.

BACKGROUND OF THE INVENTION

Animals often use man-made structures for den or nesting sites, foraging sites, or as travel routes. These types of activities can cause damage to the structures. Animal intrusions onto electric power substations and the subsequent damage to those substations is a problem that has received more attention recently by those in the electric utility industry. Damage to substations comes in the form of outages, direct equipment damage, and safety hazards to maintenance personnel. Over the last twenty years, wildlife damage is among the major causes of momentary outages to substations. According to a National Rural Electric Cooperative Association Survey, animals are the third leading cause of power outages. Equipment repair, revenue lost while service is down, and the indirect costs of reduced consumer confidence are some of the expenses associated with power outages.

Utility companies have used a variety of techniques in attempts to reduce wildlife damage to substations. Among the techniques are chemical repellents, fence barriers, lights, decoys (artificial owls, hawks, snakes, etc.), anti-climbing devices, lineguards, electrical fences, bushing guards, and other structural barriers. It is believed that none of these measures has been particularly successful.

The present invention is provided to solve the problems discussed above and other problems, and to provide advantages and aspects not provided by prior wildlife mitigation systems of this type. A full discussion of the features and advantages of the present invention is deferred to the following detailed description, which proceeds with reference to the accompanying drawings.

SUMMARY OF THE INVENTION

A first aspect of the present invention is directed to an animal mitigation device. The device comprises a shroud including a plurality of polymeric panels releasably joined to a frame. The frame has a base portion and a support structure rising upwardly therefrom to form a multi-sided sidewall. The shroud further has a removable access to an internal volume of the shroud.

This aspect of the present invention may include one or more of the following features, alone or in any reasonable combination. The sidewall may comprise a low coefficient of friction surface. The sidewall may comprise a polymeric material. The shroud may have an uppermost edge at least 24 inches above a ground level. The door may be releasably attached to the shroud by a removable pin. The base portion may form a circumferential ring about the internal volume. A lower edge of each panel may be attached to the base portion and upper portions of each panel may be attached to the support structure. Each panel may be attached to the base via a male/female connection. Each panel may have a U-shaped channel along a lower portion, and a portion of the base may be received within the U-shaped channel. Each panel may comprise an L-shape configuration. The panels may be attached to the base by a plurality of removable pins. Cross members may support the panels within the internal volume of the shroud. The base member may be attached to a concrete pedestal, a wooden bottom frame, and/or buried several inches about a perimeter of the shroud. The shroud may have an uppermost portion flared radially outwardly. The uppermost portion of the shroud may be flared upwardly and radially outwardly. The uppermost portion of the shroud may be flared downwardly and radially outwardly. An upper portion of the shroud may have a first flared portion flared downwardly and radially outwardly and a second flared portion flared upwardly and radially outwardly. The shroud may surround an electrical substation component from a baseline upwardly wherein a lower portion of the electrical substation component is housed within the internal volume of the shroud.

Another aspect of the present invention is directed to an electrical substation. The substation comprises a plurality of substation components selected from a group consisting of circuit breakers, transformers, voltage regulators, switchgear, control houses, and structural members, wherein each of the plurality of substation components is supported above ground-level, and an animal mitigation system surrounding each of the plurality of substation components. The animal mitigation system may comprise any of the features previously described, alone or in any combination.

Another aspect of the present invention is directed to an electrical substation. The substation comprises a plurality of substation components selected from a group consisting of circuit breakers, transformers, voltage regulators, switchgear, control houses, and structural members wherein each of the plurality of substation components is supported above ground-level, and the substation further comprises an animal mitigation system comprising a shroud spaced radially outwardly from each of the plurality of substation components. The shroud comprises a frame comprising a base spaced radially outwardly from each of the plurality of substation components, a sidewall of a polymeric material comprising a plurality of generally planar components attached to the frame and rising upwardly from the base, the sidewall forming a generally circumferential barrier about each of the plurality of substation components, a door in the shroud to permit access to each of the plurality of substation components, a removable pin located radially inwardly from a radially outermost portion of the shroud for removably securing the door to a portion of the shroud.

Another aspect of the present invention is directed to an electrical substation. The substation comprises a plurality of substation components and an animal mitigation system. Each of the plurality of substation components is supported above ground-level. The animal mitigation system comprises a plurality of shrouds, each spaced radially outwardly from each of the plurality of substation components. Each shroud comprises a frame comprising a base spaced radially outwardly from a portion of one of the substation components, a sidewall of the shroud forming a generally circumferential barrier about an internal volume in which the portion of the substation component is located, and an access in the shroud to permit access to the portion of the substation component within the internal volume.

This aspect of the present invention may include one or more of the following features, alone or in any reasonable combination. The sidewall may comprise a plurality of panels releasably attached the frame. Each panel may have a coefficient of friction less than a coefficient of friction of the portion of the substation component within the internal volume. Each panel may be produced from a polymeric material attached to the frame and rises upwardly from the base. Each component may be selected from a group consisting of circuit breakers, transformers, voltage regulators, switchgear, control houses, and structural members. A removable pin may be located radially inwardly from a radially outermost portion of the shroud for removably securing the access to a portion of the shroud. The shroud may further comprise a deflector extending radially outwardly from the sidewall relative to the portion of the substation component within the internal volume.

Another aspect of the invention is directed to a method of deterring animal access to an electrical substation component. The method comprises the steps of: providing a frame comprising a base; placing the base spaced radially outwardly from each of the plurality of substation components; attaching a sidewall of a polymeric material comprising a plurality of wall components attached to the frame and rising upwardly from the base, the sidewall forming a barrier about each of the electrical substation component.

This aspect of the invention may include one or more of the following features, alone or in any combination. A door may be provided in the sidewall to permit access to the electrical substation component. Any of the features described above, below, or in the drawings or merely shown in the drawings may be provided in the method of this aspect of the invention.

Another aspect of the present invention is directed to an animal mitigation structure as shown and described.

Another aspect of the present invention to directed to an electrical substation as shown and described.

Another aspect of the present invention is directed to a method of deterring animal access to an electrical substation component as shown and described.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 7 is a perspective view of a connection mechanism of the present invention;

FIG. 8 is a perspective view of a connection mechanism of the present invention;

DETAILED DESCRIPTION

Figure 1:
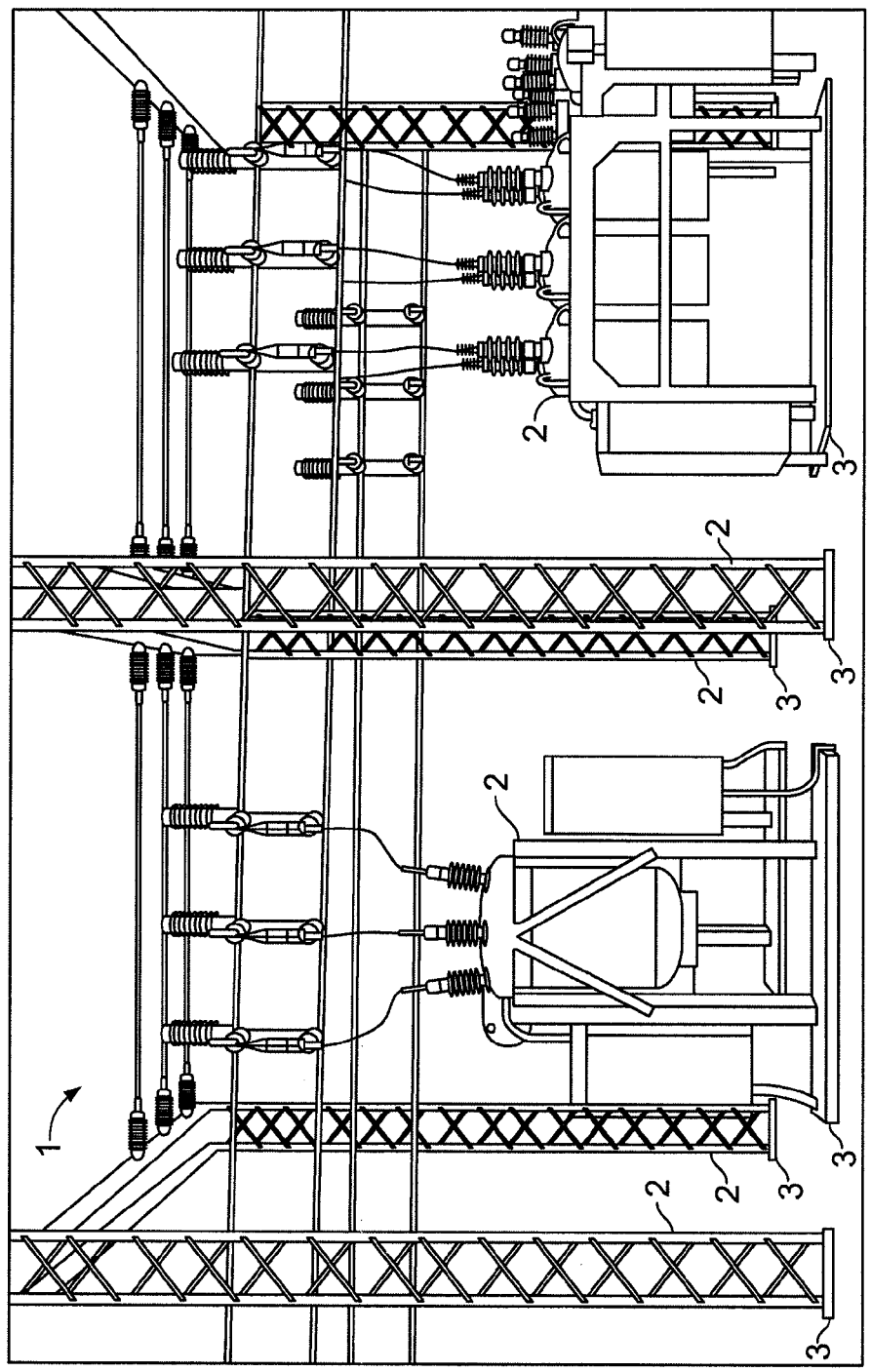
FIG. 1 is a perspective view of an existing electrical substation.
Figure 2:
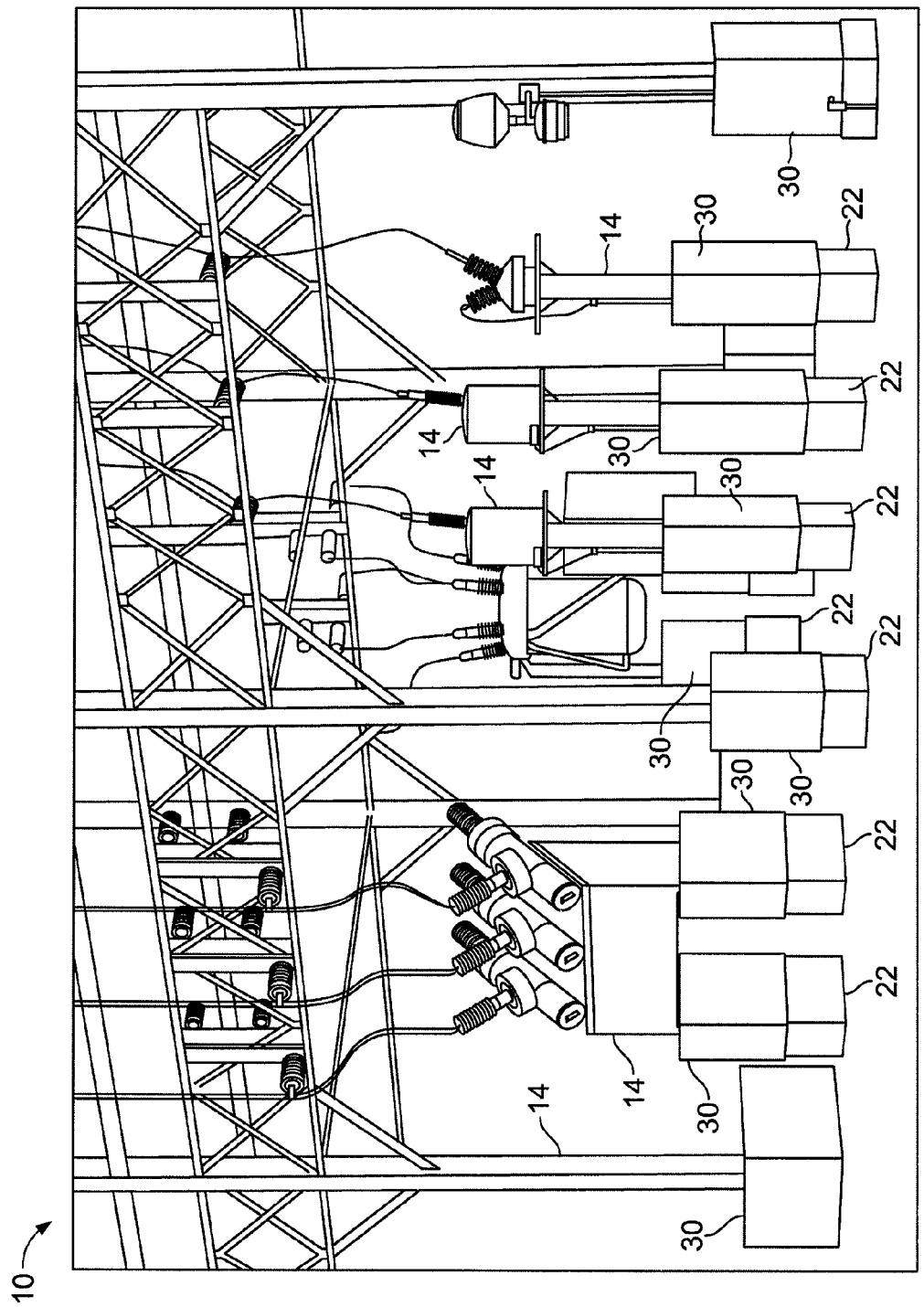
FIG. 2 is a perspective view of an electrical substation according to the present invention.
Figure 3:
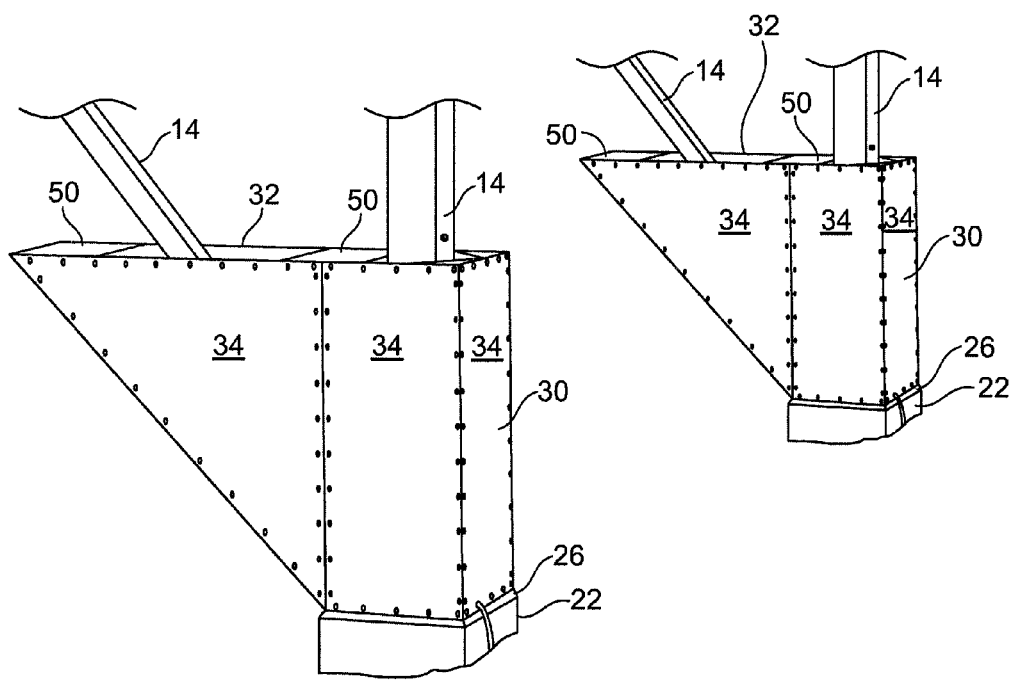
FIG. 3 is a perspective view of a support member of the present invention.
Figure 4:
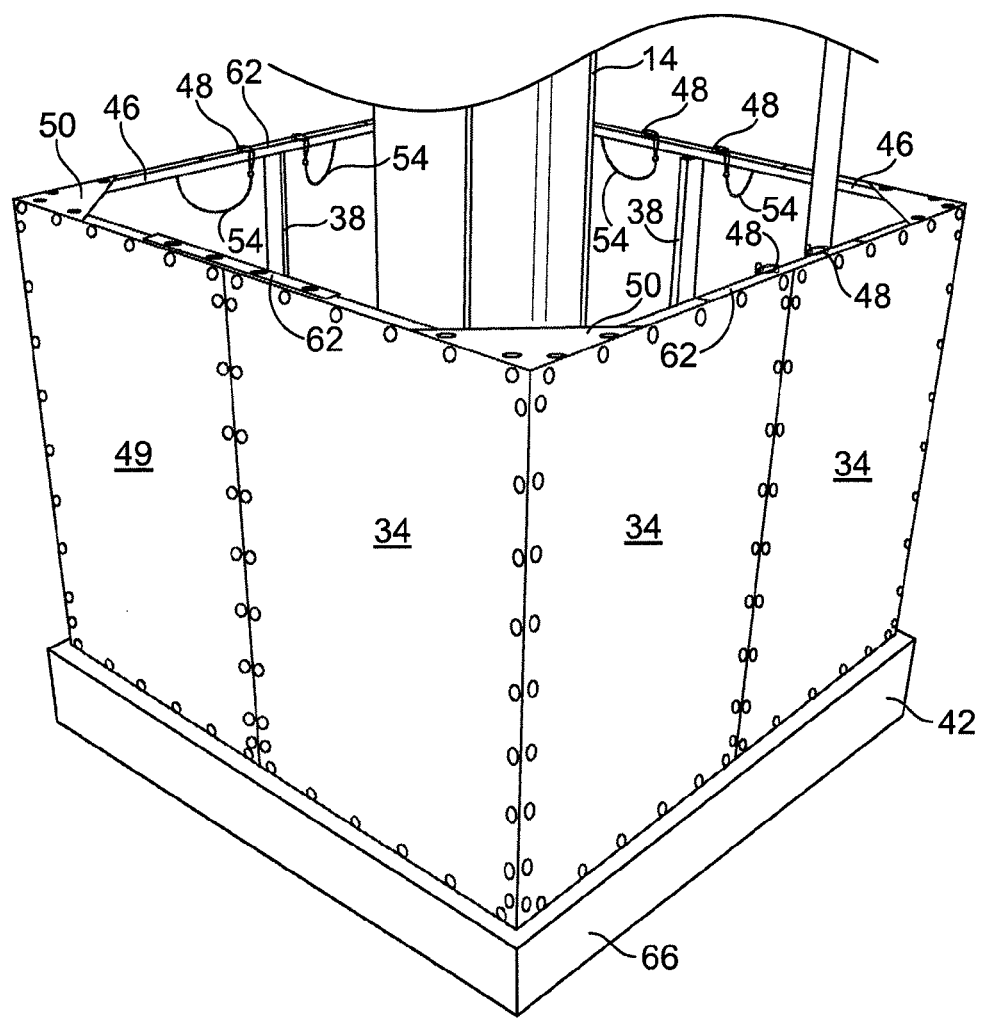
FIG. 4 is a perspective view of a support member of the present invention.
Figure 5:
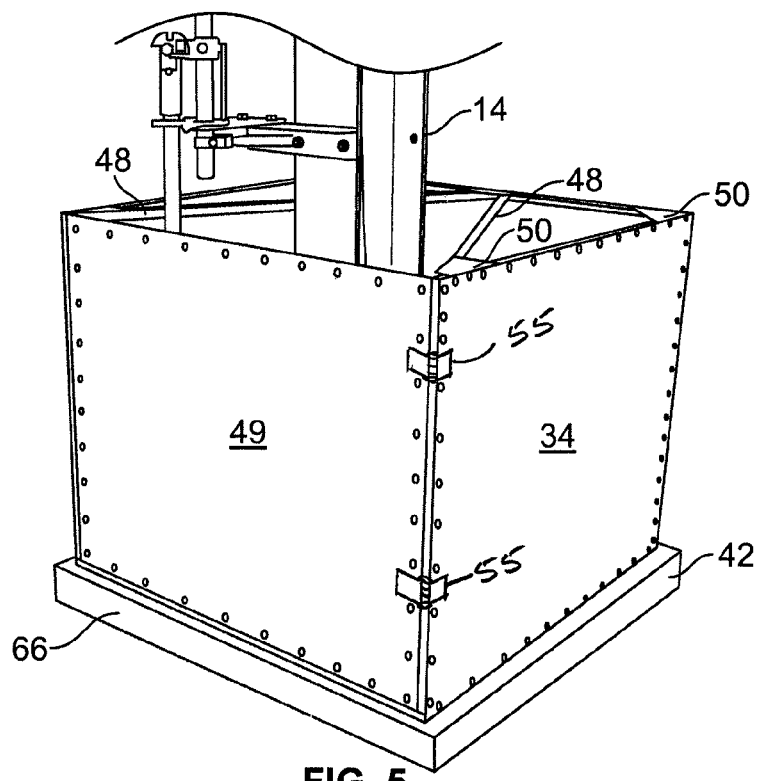
FIG. 5 is a perspective view of a support member of the present invention.
Figure 6:
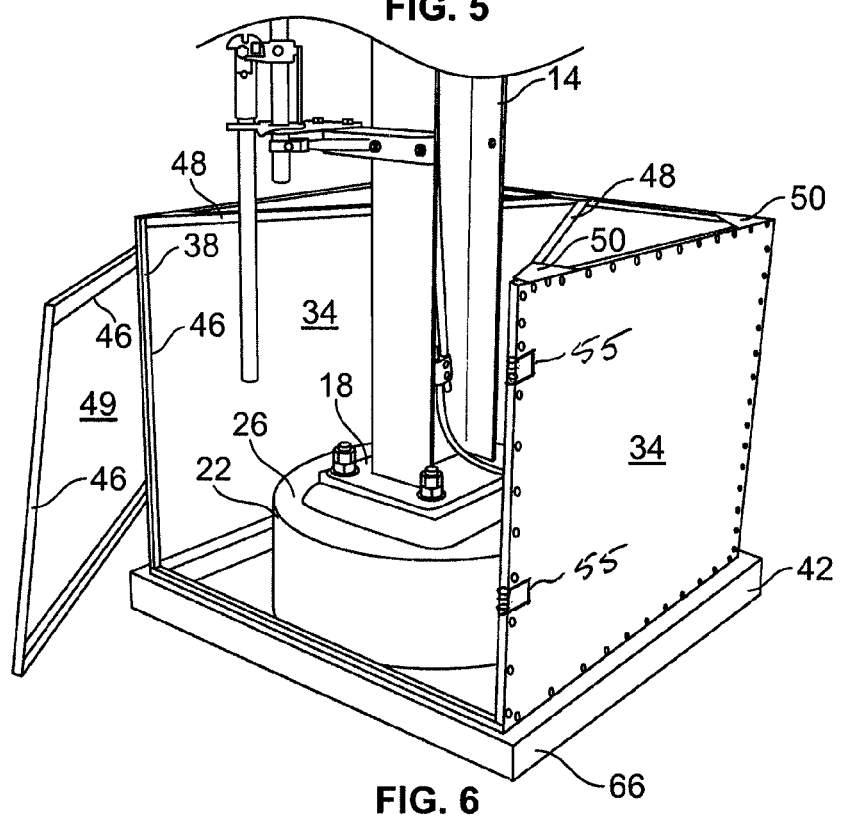
FIG. 6 is a perspective view of the support member of FIG. 5 with a panel removed.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a typical electrical substation 1 is illustrated. The substation 1 comprises a plurality of substation components 2, such as circuit breakers, transformers, voltage regulators, switchgear, control houses, and structural members. Some of these components 2 are mounted to bases 3 at or very near ground level using concrete slabs. Others are mounted on bases 3 elevated above ground level on concrete pedestals. Sometimes, the typical substation 1 may be accessed freely without barriers. Most times, however, the substations 1 are surrounded by a barrier such as a fence, chain link or otherwise. The fences may be outfitted with a further deterrent, such as barbed wire and the like, along a top portion thereof. These types of barriers have been largely unsuccessful in mitigating wildlife intrusions onto the components 2.

Referring to FIGS. 2-16, an electrical substation 10 of the present invention comprises a plurality of substation components 14, such as circuit breakers, transformers, voltage regulators, switchgear, control houses, structural members, and the like. Each component 14 generally includes a base 18. The base 18 is generally mounted to a concrete pedestal 22, referred to hereinafter, collectively, as pedestals.

Some of the pedestals 22 have a top surface 26 located just above ground level. Others have top surfaces 26 that are many inches above ground level. Most of the pedestals 22 have a top surface area much greater than a surface area of the base 18 of the component 14 mounted to it. The pedestals 22 are generally a cube of concrete having a quadrilateral cross-sectional shape, either rectangular or square. However, some of the pedestals 22 are a solid cylinder of concrete. However, it should be understood that pedestals 22 in the industry vary greatly by size, shape, and orientation. It is known in the industry to have pedestals 22 in pairs or split in middle.

Each component 14 is surrounded by a shroud 30. The shroud 30 may have an uppermost edge 32 at least 24 inches above a ground level, sometimes greater than 40 inches. The shrouds 30 are generally multi-sided structures produced from a material having a coefficient of friction substantially less than a coefficient of friction of a portion of the component 22 near the base 18, such as a low coefficient of friction material, e.g. a rigid, high-gloss polymeric material, like Plexiglas. However, in any specific application, the ideal method of determining the coefficient of friction of materials is by trials. For example, the coefficient of friction of a material is greatly affected by surface films.

Each shroud 30 comprises a plurality of panels 34 joined to a frame 38. The panels 34 preferably have a solid, preferably smooth or polished, or coated, exposed surface as opposed to a chain-link or outer perforated surface. Each panel 34 may comprise an L-shape configuration.

The frame 38 has a base portion 42 and beam members 46 rising upwardly therefrom. The frame 38 includes cross members 48 to support the panels 34. The cross members 48 span the internal volume of the shroud 30. Gussets 50 or other structural members may be provided to lend additional support to the sidewalls and frame 38.

In combination with the panels 34, the frame 38 forms a multi-sided sidewall and an access 49, such as a door, for accessing an internal volume of the shroud 30 in which at least a portion of the substation component 14 is housed. Thus, the shroud 30 provides a barrier about the component 14 or a portion of the component. The access 49 is releasably attached to a remaining portion of the shroud 30, preferably by a removable pin 48 attached to the shroud 30 by a lanyard 54 or similar device. It is contemplated that other means for removable attachment may be used, such as screws, bolts, hook and loop connectors, tongue and groove connectors, male/female connectors, magnet connectors, etc. It is further contemplated that the releasably attached door me further be hingedly joined to the shroud 30 by a hinge 55, in either a clockwise pivot, counterclockwise pivot, lifting pivot, or lowering pivot orientation. The hinge 55 may serve a releasable a means of attachment or a pivot point about which the door 49 or a panel 34 may pivot about a remaining portion of the shroud 30.

Figure 9:
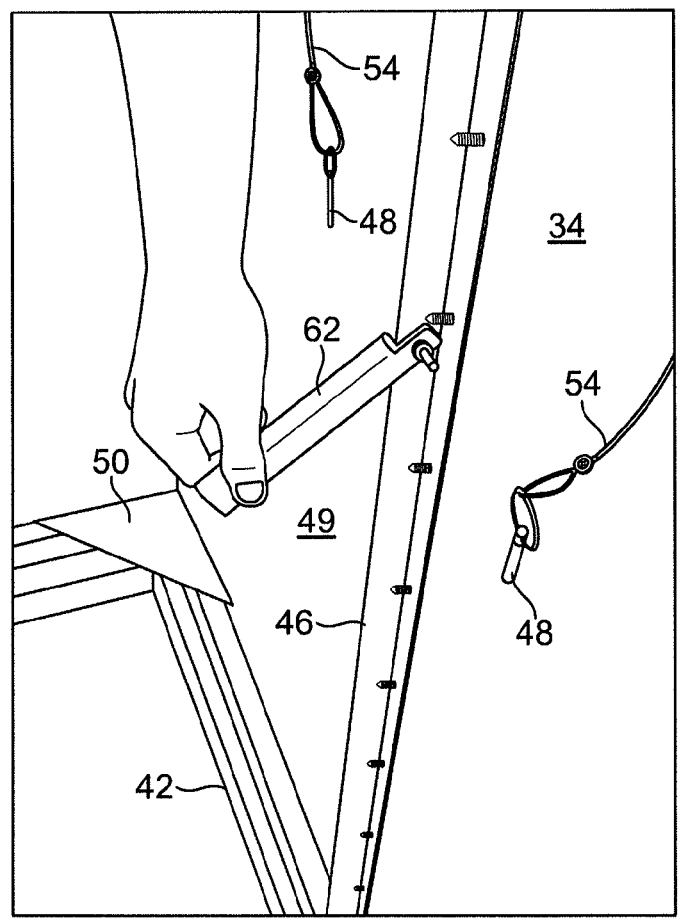
FIG. 9 is a perspective view of a connection mechanism of the present invention.
Figure 10:
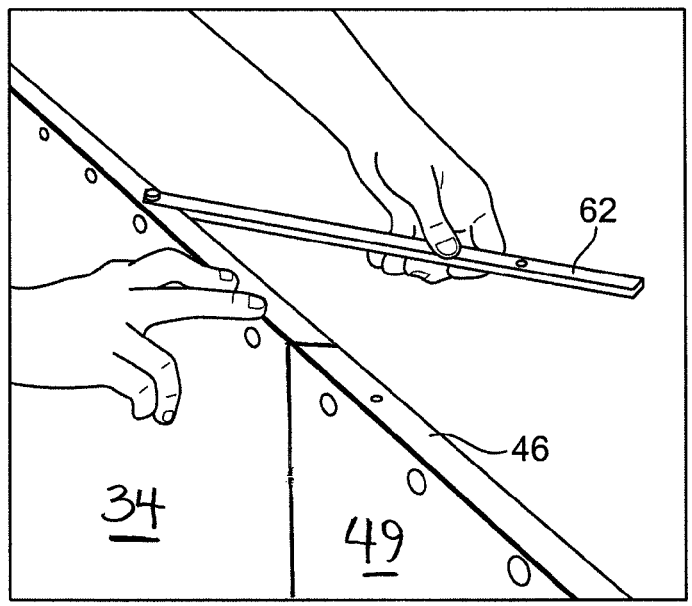
FIG. 10 is a perspective view of a connection mechanism of the present invention.
Figure 11:
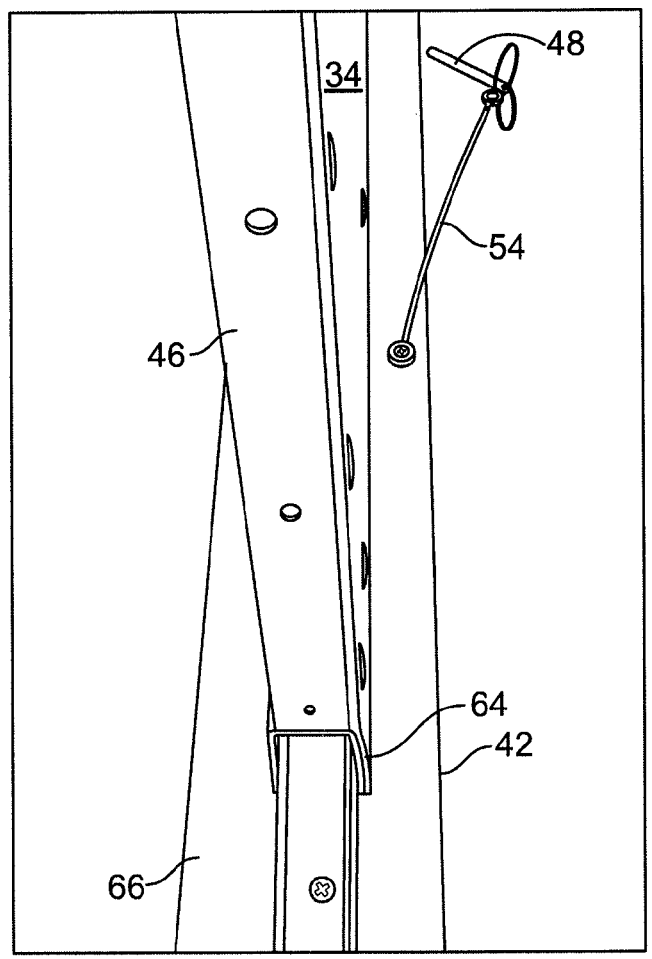
FIG. 11 is a perspective view of a base member of the present invention.
Figure 12:
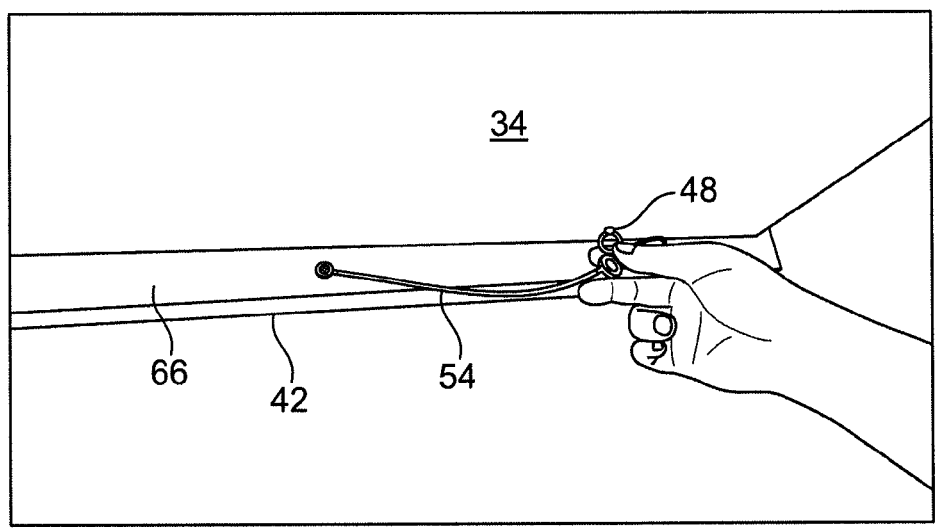
FIG. 12 is a perspective view of a pin connection mechanism of the present invention.

FIGS. 7-9 illustrate removable attachment of the access 49 to the frame 38 attached to an adjoining panel 34. As illustrated, the frame 38 includes beam members 46 fixedly attached to the panels 34. The beam members 46 may be lengths of rigid angled material, such as angle iron. The beam members of adjoining panels 34 are brought into alignment, and a sleeve 62 may be placed around the beam members 46 such that a removable pin 48 may be inserted through aligned apertures in the beam members 46 and the sleeve 62. The sleeve 62 is preferable a folded rigid member having a V-shape in cross-section and a length substantially less than a height or length of the panel and/or the length of rigid angled material. This means of connection provides an access to the internal volume of the shroud 30. As such, one or more panels may be releasably attached to the frame 38 or an adjoining panel to form a door.

The base portion 42 generally forms a circumferential ring about the internal volume. A lower edge of each panel 34 may be attached to the base portion 42 and upper portions of each panel 34 are attached to the frame 38. Each panel 34 may be attached to the base 42 via a male/female connection. Each panel 34 has a U-shaped channel 64 along a lower portion. A portion of the base 42 is received within the U-shaped channel 64. More removable pins 48 are used to attach the panel 34 to the base 42.

The base member 42 may be attached directly to the concrete pedestal 22. Alternatively, the base 42 may comprise a bottom frame 66 fixed to the ground or the concrete pedestal 22, and/or buried several inches about a perimeter of the shroud 30. The inventors further contemplate that the frame may be 66 formed from wood, polymers or concrete.

Figure 13:
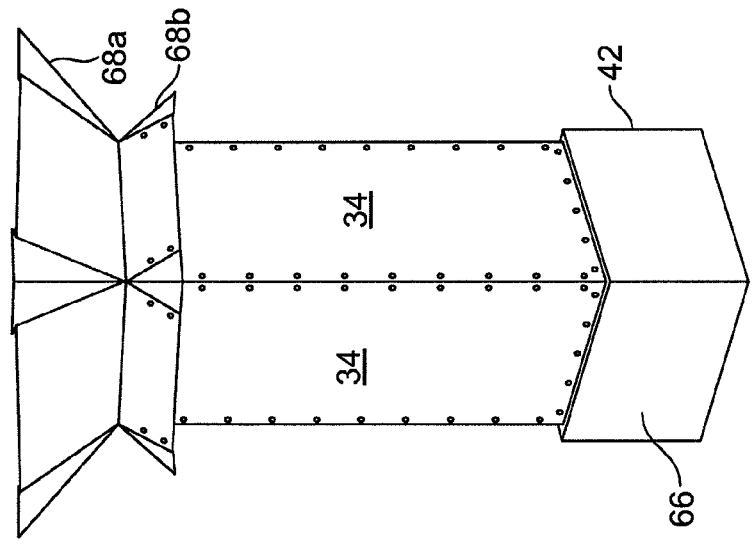
FIG. 13 is a perspective view of a shroud of the present invention.
Figure 14:
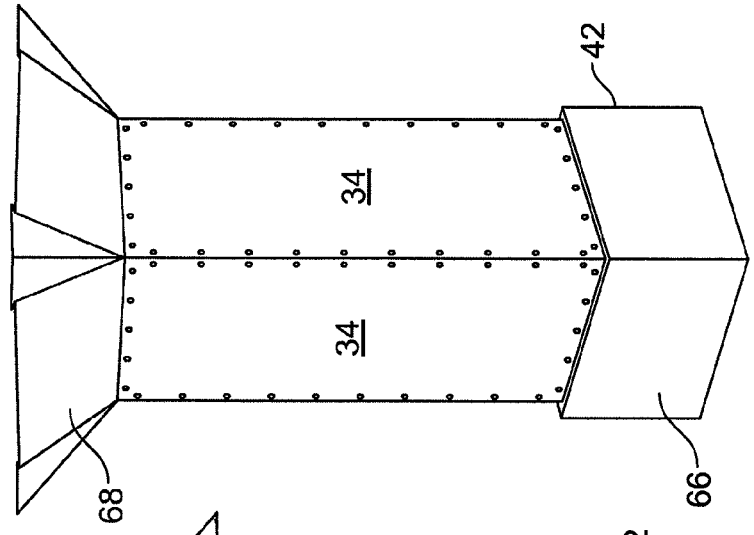
FIG. 14 is a perspective view of an alternative shroud of the present invention.
Figure 15:
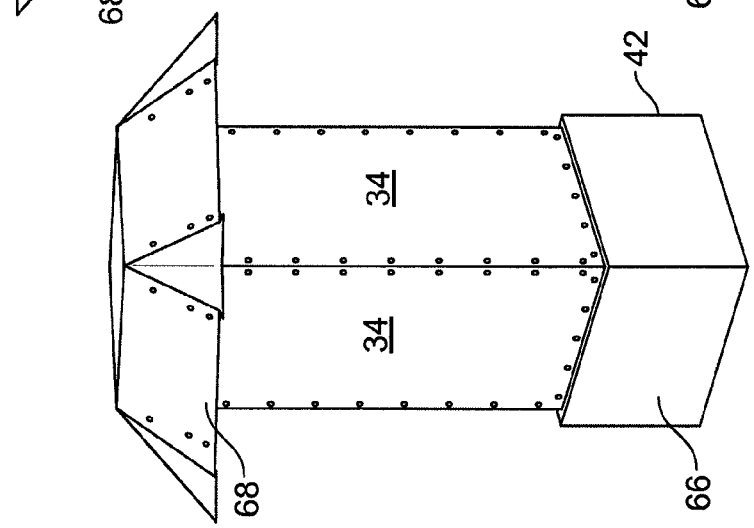
FIG. 15 is a perspective view of an alternative shroud of the present invention.

In embodiments illustrated in FIGS. 13-15, the shroud 30 may have an uppermost portion having a radially outwardly extending deflector 68, preferably, though not necessarily, circumferential and extend radially outwardly from a plane or planes defined by the sidewall. The deflector 68 may be flared downwardly and radially outwardly as shown in FIG. 13. The deflector 68 may be flared upwardly and radially outwardly as illustrated in FIG. 14. The shroud 30 may comprise a plurality of differently oriented deflectors 68. The example shown in FIG. 15 has a pair of circumferential deflectors 68,b. One of the pair of deflectors 68a extends upwardly and outwardly relative to a plane defined by the sidewall from which it extends; the other deflector 68b extends downwardly and outwardly relative to a plane defined by the sidewall from which it extends.

The embodiment illustrated in FIG. 13 is particularly useful and provides specific advantages, especially in mitigating intrusion by rodents, such as squirrels. For instance, the deflector 68 oriented radially outwardly and downwardly relative to the upper edge of the shroud 30 prevents wildlife from encroaching on the upper edge of the shroud 30 and, therefore, provides a greater barrier to entry of the internal volume. The angle and length of the deflector is important. The inventors have discovered that the deflector should by angled greater than 15° from the panel 34 from which it extends, preferably between 15° and 90°, more preferably between 15° and 40°, and most preferably about 33°, or any range or combination of ranges therein. The angle of the deflector 68 can be maintained by a triangular support member beneath an upper surface of the deflector 68, between the deflector 68 and the panel 34. The length of each panel member of the shroud should be greater than 12 inches, preferably about 14 inches. Also, any fasteners used to join adjacent panel members of the deflector 68 must be flush with, or substantially flush with, the panel members, so rodents cannot use the extending fastener as a means to increase the coefficient of friction of the shroud 30 and thereby climb the shroud and gain access to the internal volume. Fasteners extending from the panels can be clipped or sawed to achieve the desired flushness. The orientation of the deflector 68 provides the further advantage that it does not catch debris or water due to its downward rather than upward extension. This keeps the internal volume cleaner and less vulnerable to debris collection, which debris must be cleaned on a routine basis.

Figure 16:
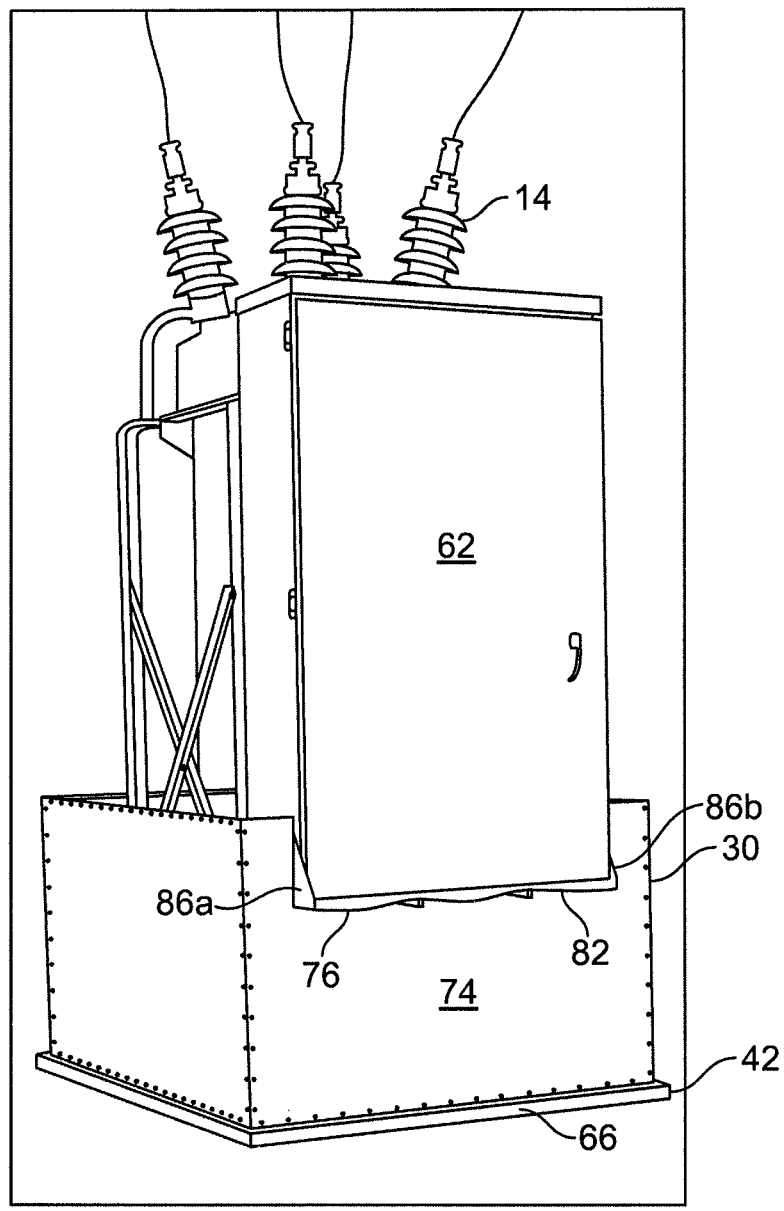
FIG. 16 is a perspective view of an alternative shroud of the present invention.

As illustrated in FIG. 16, at times, it may be impossible or impractical to fully surround the substation component 14 with a shroud 30. This occurs when a door 72 to the component 14 must be easily and quickly accessed. In these instances, the door 72 of the component may extend beyond a plane defined by a sidewall 74 of the shroud 30 protecting the component 14. A deflector 76 adapted, as in sized, shaped and located, to protect an underside of the component 14 and the lowermost sides 80 of the component 14 may be added to the shroud 30 to prevent wildlife from encroaching on the internal volume of the shroud 30. This type of deflector 76 will generally include a first portion 82 extending outwardly from the sidewall of the shroud 30 beneath the door 72 and a pair of opposing side portions 86a,b angled upwardly relative to the first portion and located on opposing sides of the door 72 of the component 14. This embodiment is particularly useful in mitigating intrusions by snakes.

Accordingly, it should be understood that present invention may be considered to extend to an electrical substation. The substation comprises a plurality of substation components selected from a group consisting of circuit breakers, transformers, voltage regulators, switchgear, control houses, and structural members wherein each of the plurality of substation components is supported above ground-level, and an animal mitigation system surrounds each of the plurality of substation components. The animal mitigation system may comprise any of the features previously described, alone or in any combination.

The animal mitigation system of the present invention generally comprises a shroud spaced radially outwardly from each of the plurality of substation components. The shroud includes a frame comprising a base spaced radially outwardly from each of the plurality of substation components, a sidewall of a polymeric material comprising a plurality of generally planar components attached to the frame and rising upwardly from the base, the sidewall forming a generally circumferential barrier about each of the plurality of substation components, a door in the shroud to permit access to each of the plurality of substation components, a removable pin located radially inwardly from a radially outermost portion of the shroud for removably securing the door to a portion of the shroud.

It is further contemplated that the present invention is directed to a method of deterring animal access to an electrical substation component. The method comprises the steps of: providing a frame comprising a base; placing the base spaced radially outwardly from each of the plurality of substation components; attaching a sidewall of a polymeric material comprising a plurality of wall components attached to the frame and rising upwardly from the base, the sidewall forming a barrier about each of the electrical substation component. Any of the features described above or in the figures or merely shown in the figures may be provided in the method of this aspect of the invention.

The animal mitigation systems described herein have been typically illustrated for use in electrical substations; however, one of ordinary skill in the art would readily recognize that the animal mitigation systems described and illustrated herein could be used to protect any number of structures from intrusion by unwanted animals that may climb and/or nest in an undesirable location, which may or may not be energized equipment, such as those found in electrical substations, for example flag poles, bird feeders, trees, playground equipment, viaducts, bridges, culverts, drainage equipment, virtually any structural elements/members, etc.

A person of ordinary skill in the art would further readily recognize that any of the features shown in the figures and/or described herein may be used or provided, in any reasonable combination, with any of the aspects of the present invention without departing from the spirit of the invention.

The terms "first," "second," "upper," "lower," "top," "bottom," etc. are used for illustrative purposes relative to other elements only and are not intended to limit the embodiments in any way. The term "plurality" as used herein is intended to indicate any number greater than one, either disjunctively or conjunctively as necessary, up to an infinite number. The terms "joined," "attached," and "connected" as used herein are intended to put or bring two elements together so as to form a unit, and any number of elements, devices, fasteners, etc. may be provided between the joined or connected elements unless otherwise specified by the use of the term "directly" and/or supported by the drawings.

While the specific embodiments have been illustrated and described, numerous modifications come to mind without significantly departing from the spirit of the invention, and the scope of protection is only limited by the scope of the accompanying Claims.

What is claimed is:

1. An electrical substation comprising:
a plurality of substation components wherein each of the plurality of substation components is supported above ground-level; and
an animal mitigation system comprising a plurality of shrouds spaced radially outwardly from each of the plurality of substation components, each shroud comprising:
a frame comprising a base spaced radially outwardly from a portion of at least one of the plurality of substation components;
a sidewall forming a generally circumferential barrier about an internal volume in which the portion of the at least one of the plurality of substation components is located, the sidewall comprising a plurality of panels attached to the frame and a coefficient of friction of each of the panels less than a coefficient of friction of the portion of the at least one of the plurality of substation components within the internal volume wherein the coefficient of friction of the panels protects the portion of the at least one of the plurality substation components from intrusion by unwanted animals that may climb the portion of the at least one of the plurality substation components; and
a door in the sidewall to permit access to the portion of the at least one of the plurality of substation components within the internal volume.

2. The electrical substation of claim 1 wherein the door is hingedly joined to a remaining portion of one of the shrouds.

3. The electrical substation of claim 2 wherein each panel is produced from a polymeric material attached to the frame and rising upwardly from the base.

4. The electrical substation of claim 3 wherein the panels are releasably attached the frame.

5. The electrical substation of claim 4 wherein a removable pin is located radially inwardly from a radially outermost portion of one of the shrouds for removably securing the access to a portion of one of the shrouds.

6. The electrical substation of claim 1 wherein one of the shrouds comprises a deflector extending radially outwardly from the sidewall relative to the portion of the at least one of the plurality of substation components within the internal volume.

7. The electrical substation of claim 6 wherein the deflector is circumferential.

8. The electrical substation of claim 7 wherein the deflector extends upwardly relative to the base.

9. The electrical substation of claim 7 wherein the deflector extends downwardly relative to an uppermost portion of one of the shrouds.

10. The electrical substation of claim 7 wherein the deflector has a first portion extending upwardly relative to the base and a second portion that extends downwardly relative to an uppermost portion of one of the shrouds.

11. An electrical substation comprising:
a plurality of substation components wherein each of the plurality of substation components is supported above ground-level; and an animal mitigation system comprising a shroud spaced radially outwardly from each of the plurality of substation components, the shroud comprising:
a plurality of polymeric panels releasably joined to a flame having a base portion spaced radially outwardly from a portion of at least one of the plurality of substation components and a plurality of beam members rising upwardly therefrom to form a multi-sided sidewall and a removable door to an internal volume of the shroud, wherein the plurality of polymeric panels forms a generally circumferential barrier about an internal volume in which the portion of the at least one of the plurality of substation components is located, each of the panels comprising a coefficient of friction less than a coefficient of friction of the portion of the at least one of the plurality of substation components within the internal volume, wherein the coefficient of friction of the panels protects the portion of the at least one of the plurality of substation components from intrusion by unwanted animals that may climb the portion of the at least one of the plurality of substation components, and wherein the door permits access to the portion of the at least one of the plurality of substation components within the internal volume.

12. The animal mitigation device of claim 11 wherein the shroud has an uppermost edge at least 24 inches above a ground level.

13. The animal mitigation device of claim 11 wherein the door is hingedly joined to a remaining portion of the shroud.

14. The animal mitigation device of claim 13 wherein a lower edge of each panel is attached to the base portion and upper portions of each panel are attached to a corresponding beam member of the plurality of beam members.

15. The animal mitigation device of claim 14 wherein each panel has a U-shaped channel along a lower portion and wherein a portion of the base is received within the U-shaped channel.

16. The animal mitigation device of claim 15 wherein the panels are attached to the base by a plurality of removable pins.

17. The animal mitigation device of claim 16 wherein cross members support the panels within the internal volume of the shroud.

18. The animal mitigation device of claim 17 wherein the shroud has an upper portion flared radially outwardly.

19. The animal mitigation device of claim 18 wherein the upper portion of the shroud is flared upwardly and radially outwardly.

20. The animal mitigation system of claim 19 wherein the upper portion of the shroud has a first flared portion flared downwardly and radially outwardly and a second flared portion flared upwardly and radially outwardly.

* * * * *

UNITED STATES PATENT AND TRADEMARK OFFICE
CERTIFICATE OF CORRECTION

| | | |
|---|---|---|
| PATENT NO. | : 9,018,523 B1 | Page 1 of 1 |
| APPLICATION NO. | : 13/737155 | |
| DATED | : April 28, 2015 | |
| INVENTOR(S) | : W. Scott Lehman | |

It is certified that error appears in the above-identified patent and that said Letters Patent is hereby corrected as shown below:

In the Claims

In Column 8, Line 22, in Claim 1, delete "plurality substation" and insert --plurality of substations-- therefor;

In Column 8, line 24, in Claim 1, delete "plurality substation" and insert --plurality of substations-- therefor; and, In Column 8, line 35, in Claim 4, delete "attached the" and insert --attached to the-- therefor.

Signed and Sealed this
Fourteenth Day of July, 2015

Michelle K. Lee
*Director of the United States Patent and Trademark Office*